(12) United States Patent
McLerran

(10) Patent No.: US 6,979,005 B1
(45) Date of Patent: Dec. 27, 2005

(54) STACKABLE DOLLIES AND DOLLY SYSTEMS

(75) Inventor: Steve McLerran, Henderson, CO (US)

(73) Assignee: Chriscott Supply, Inc., Denver, CO (US)

( * ) Notice: Subject to any disclaimer, the term of this patent is extended or adjusted under 35 U.S.C. 154(b) by 94 days.

(21) Appl. No.: 10/463,239

(22) Filed: Jun. 16, 2003

Related U.S. Application Data

(60) Provisional application No. 60/389,706, filed on Jun. 17, 2002.

(51) Int. Cl.[7] ............................ B65D 19/42; B63B 3/16
(52) U.S. Cl. ............................ 280/33.998; 280/79.11; 280/87.021; 280/32.6; 108/53.1
(58) Field of Search .......................... 280/32.6, 87.021, 280/87.041, 87.042, 47.36, 79.11, 33.998; 108/53.3, 53.1

(56) References Cited

U.S. PATENT DOCUMENTS

| | | | |
|---|---|---|---|
| 2,862,720 A | 12/1958 | Stone et al. | |
| 3,523,694 A * | 8/1970 | Oliver | 280/33.998 |
| 3,689,098 A * | 9/1972 | Rubin | 280/33.998 |
| 4,611,962 A * | 9/1986 | Braly et al. | 410/57 |
| 4,720,115 A | 1/1988 | Rehrig | |
| D340,562 S | 10/1993 | Kean et al. | |
| D352,586 S | 11/1994 | Baucom | |
| 5,445,396 A | 8/1995 | Sebor | |
| 5,556,118 A * | 9/1996 | Kern et al. | 280/47.16 |
| 5,711,540 A * | 1/1998 | Nesting | 280/33.998 |
| 5,823,549 A | 10/1998 | Morgan, Jr. | |
| 5,906,384 A * | 5/1999 | Nelson | 280/79.11 |
| 5,921,566 A | 7/1999 | Kern et al. | |
| D427,406 S | 6/2000 | Hartwall | |
| 6,203,031 B1 | 3/2001 | Leverington | |
| D445,554 S | 7/2001 | Blason et al. | |
| 6,257,152 B1 * | 7/2001 | Liu | 108/53.3 |
| 6,345,828 B1 * | 2/2002 | Pool et al. | 280/32.6 |
| D456,972 S | 5/2002 | Blason et al. | |
| 6,382,643 B1 | 5/2002 | Baker | |
| 6,561,530 B2 * | 5/2003 | Carbonero | 280/87.041 |
| 6,607,199 B2 * | 8/2003 | Gruber | 280/33.991 |
| 6,886,787 B2 * | 5/2005 | Stahl | 248/129 |
| 2003/0205877 A1 * | 11/2003 | Verna et al. | 280/79.11 |
| 2003/0213878 A1 * | 11/2003 | Stahl | 248/129 |
| 2005/0151336 A1 * | 7/2005 | Neuman | 280/79.11 |

* cited by examiner

*Primary Examiner*—Jeff Restifo
(74) *Attorney, Agent, or Firm*—Christopher C. Sappenfield; Quine Intellectual Property Law Group P.C.

(57) ABSTRACT

Stackable dollies that each include a platform component having a plurality of indentations that is structured to receive wheel components of other dollies are provided. Stackable dolly systems and related methods are also provided.

16 Claims, 11 Drawing Sheets

STACKABLE DOLLIES AND DOLLY SYSTEMS

CROSS-REFERENCES TO RELATED APPLICATIONS

This application claims the benefit of U.S. Provisional Application No. 60/389,706, filed Jun. 17, 2002, the disclosure of which is incorporated by reference.

COPYRIGHT NOTIFICATION

Pursuant to 37 C.F.R. § 1.71(e), Applicants note that a portion of this disclosure contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

1. Field of the Invention

The present invention relates generally to dollies useful in supporting and moving objects, and more particularly, to stackable dollies, stackable dolly systems, and related methods.

2. Background of the Invention

Dollies, which typically include a platform and wheel components, are widely used to support and move objects. For example, in the moving industry dollies are commonly used to move office equipment, files, furniture, and the like to desired locations. Dolly manufacturers or distributors typically store and transport large inventories of dollies. The level of dolly storage density or efficiency often correlates with the achievable throughput and profitability of these enterprises. Many pre-existing dollies fail to store with a minimal usage of available space, thereby limiting achievable throughput and profitability. In addition, many of these pre-existing devices are not easily stacked or otherwise grouped for the simultaneous movement of multiple dollies. This inefficiency further limits achievable throughput and profitability.

From the foregoing, it is apparent that dollies that stack with an efficient use of available space and that can be readily moved in stacked groups are desirable. These and a variety of other features of the present invention will be evident upon a complete review of the following disclosure.

SUMMARY OF THE INVENTION

The invention provides stackable dollies that stack together with greater efficiency than many pre-existing dollies stack with one another. For example, the dollies described herein typically stack together with greater uniformity and occupy less available space than many other stackable dolly systems. This can significantly enhance throughput, e.g., when shipping or storing large numbers of dollies. In addition, due at least in part to the low center of gravity of the stackable dolly of the invention, objects are typically supported and moved with greater stability than can be achieved using many pre-existing dolly configurations. The invention also provides stackable dolly systems and related methods that utilize the stackable dollies described herein.

In one aspect, the invention relates to a stackable dolly that includes a platform component having first and second surfaces and at least a first plurality of indentations. The first plurality of indentations is disposed at least in the first surface. Further, the platform component is structured to support at least one object on the second surface. The first and/or second surface is typically substantially flat. The stackable dolly also includes a plurality of wheel components operably connected to the first surface of the platform component in which the first plurality of indentations is structured to receive at least portions of wheel components disposed on at least one other stackable dolly. Typically, the stackable dolly includes, e.g., 3, 4, 5, 6, or more wheel components operably connected to the first surface of the platform component, e.g., configured to correspond with the indentations disposed on another stackable dolly.

In certain embodiments, the stackable dolly includes, e.g., 3, 4, 5, 6, or more indentations disposed at least in the first surface of the platform component. Optionally, the first plurality of indentations is disposed through the platform component. In some embodiments, the stackable dolly further includes at least a second plurality of indentations disposed at least in the second surface of the platform component, which second plurality of indentations is structured to receive at least portions of wheel components disposed on another stackable dolly.

The stackable dolly of the invention optionally includes various additional components. In certain embodiments, for example, the stackable dolly further includes at least one opening disposed through the platform component, which opening is structured such that a user can grasp the stackable dolly, e.g., to carry the dolly as desired. In some embodiments, the stackable dolly further includes at least one handle component removably attached to the platform component by at least one attachment component, e.g., such that a user can move the dolly using the handle component. Optionally, the second surface comprises a retaining element (e.g., a frictional material, such as a rubber sheet or the like) that is structured to retain the object when the object is moved on the stackable dolly.

In another aspect, the invention provides a stackable dolly system that includes a plurality of stackable dollies. Each stackable dolly includes a platform component having first and second surfaces, and at least a first plurality of indentations disposed at least in the first surface. Each stackable dolly also includes a plurality of wheel components operably connected to the first surface in which the first plurality of indentations of at least a first of the stackable dollies receives at least portions of the wheel components disposed on at least a second of the stackable dollies when the first and second stackable dollies are stacked together. Typically, each of the stackable dollies includes, e.g., 3, 4, 5, 6, or more wheel components operably connected to the first surface of the platform component. In some embodiments, each of the stackable dollies further includes at least one opening disposed through the platform component, which opening is structured such that a user can grasp the stackable dolly.

Typically, each of the stackable dollies includes, e.g., 3, 4, 5, 6, or more indentations disposed at least in the first surface of the platform component. In certain embodiments, the first plurality of indentations is disposed through the platform component. In other embodiments, each of the stackable dollies further includes at least a second plurality of indentations disposed at least in the second surface of the platform component, which second plurality of indentations is structured to receive at least portions of wheel components disposed on at least a third of the stackable dollies.

DETAILED DESCRIPTION

While the present invention will be described with reference to a few specific embodiments, the description is illustrative of the invention and is not to be construed as limiting the invention. Various modifications to the present invention can be made to the embodiments described herein by those skilled in the art without departing from the true scope of the invention as defined by the appended claims. It is noted here that for a better understanding, like components are designated by like reference letters and/or numerals throughout the various figures, unless the context indicates otherwise.

Figure 1A:
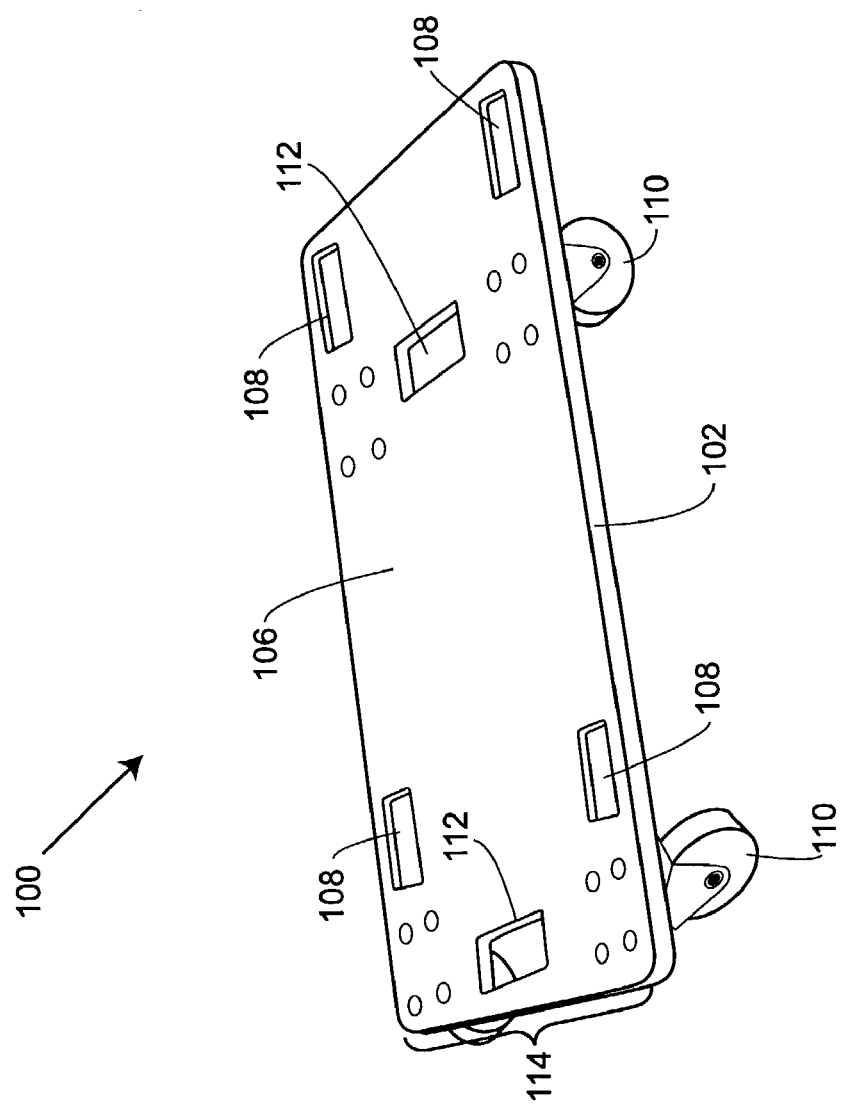
FIG. 1A schematically shows a stackable dolly from a top perspective view according to one embodiment of the invention.
Figure 1B:
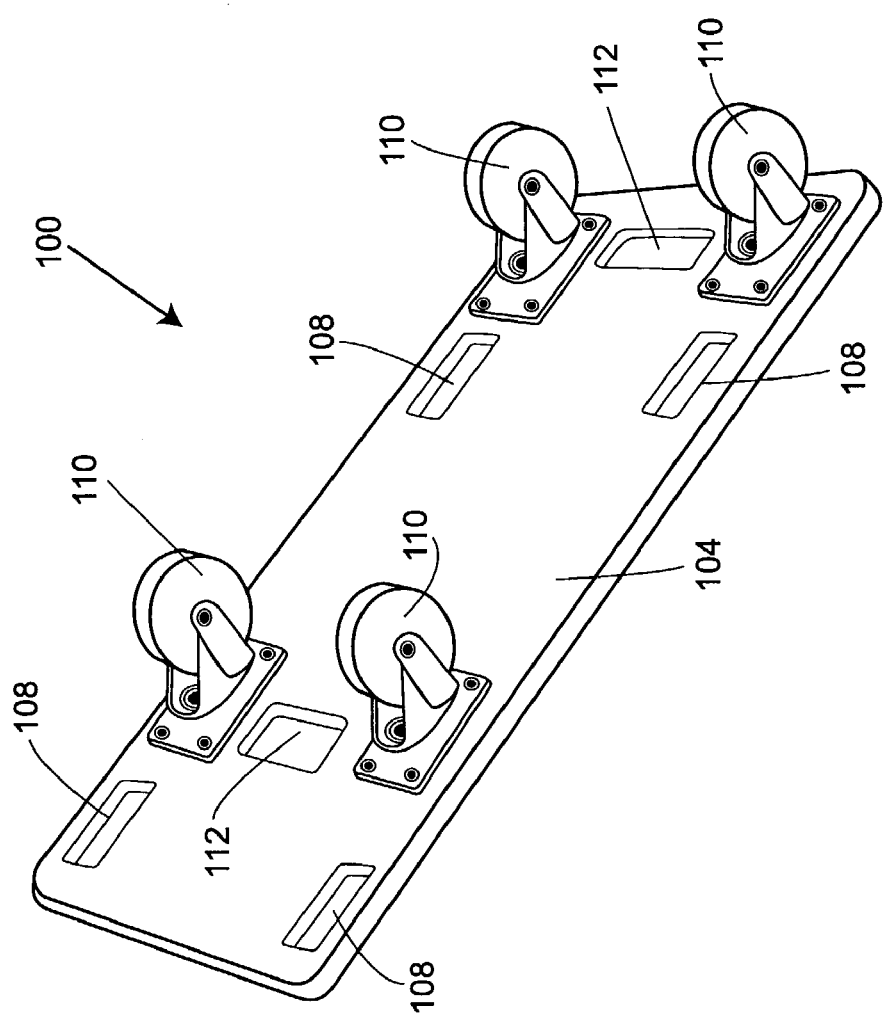
FIG. 1B schematically depicts the stackable dolly of FIG. 1A from a bottom perspective view.

Referring to FIGS. 1 A and B, stackable dolly 100 is schematically illustrated from top and bottom perspective views, respectively, according to one embodiment of the invention. As shown, platform component 102 includes first surface 104 and second surface 106, and is structured to support one or more objects (e.g., filing cabinets, boxes, furniture, office equipment, etc.) on second surface 106. Platform components are optionally fabricated from essentially any material. The particular material utilized is typically selected in view of attributes, such as cost, durability, and the like. In certain embodiments, for example, platform components are fabricated from wood, metal, polymers (e.g., plastics, etc.) or combinations of these materials. In addition, platform components are optionally fabricated with varied dimensions and shapes as selected by the user. As shown in FIGS. 1 A and B, for example, platform component 102 comprises a substantially rectangular shape. Other illustrative platform component shapes optionally include regular n-sided polygons, irregular n-sided polygons, triangles, squares, trapezoids, circles, ovals, or the like. Although first surface 104 and/or second surface 106 are shown as being substantially flat, they are also optionally formed as desired, e.g., molded to fit at least a portion of a particular object. Stackable dolly fabrication is described further below.

FIGS. 1 A and B also show wheel components 110 operably connected to first surface 104 of platform component 102. Wheel components (e.g., roller, wheels, castors, etc.) are typically spaced to correspond to indentations (described further below) disposed in or through the platform components of other stackable dollies such that at least portions of the wheel components can be positioned in the indentations to stack the stackable dollies. The stackable dollies of the invention optionally include, e.g., 3, 4, 5, 6, or more wheel components operably connected (e.g., bolted, screwed, bonded, adhered, etc.) to the first surfaces of the stackable dollies. As shown in FIGS. 1 A and B, stackable dolly 100 includes four wheel components 110. Suitable wheel components are readily available from various commercial suppliers known in the art.

As additionally shown in FIGS. 1 A and B, stackable dolly 100 further includes indentations 108 disposed through platform component 102. Indentations 108 are structured to receive at least portions of wheel components disposed on another stackable dolly, e.g., when the stackable dollies are stacked according to the methods described herein. The stackable dollies of the invention optionally include various numbers of indentations, which typically correspond to the number of wheel components operably connected to the platform components of other stackable dollies with which they are stacked. For example, a stackable dolly of the invention optionally includes, e.g., 3, 4, 5, 6, or more indentations disposed at least in the first surface of the platform component. As shown, stackable dolly 100 includes four indentations 108 disposed through platform component 102. As with platform components, indentations are optionally formed in various dimensions and shapes. More specifically, representative indentation shapes optionally include regular n-sided polygons, irregular n-sided polygons, triangles, squares, rectangles, trapezoids, circles, ovals, or the like.

Figure 2B:
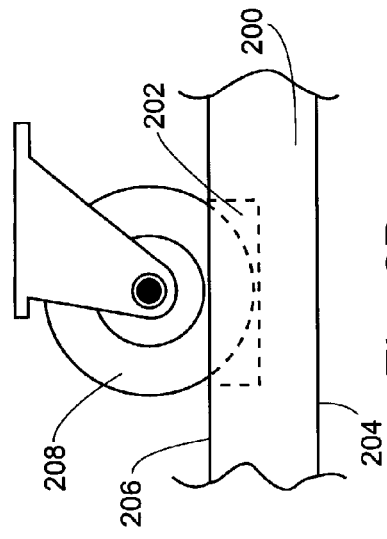
FIG. 2B schematically shows a cross-sectional view of a portion of a platform component having an indentation disposed in a second surface of the platform component.
Figure 2C:
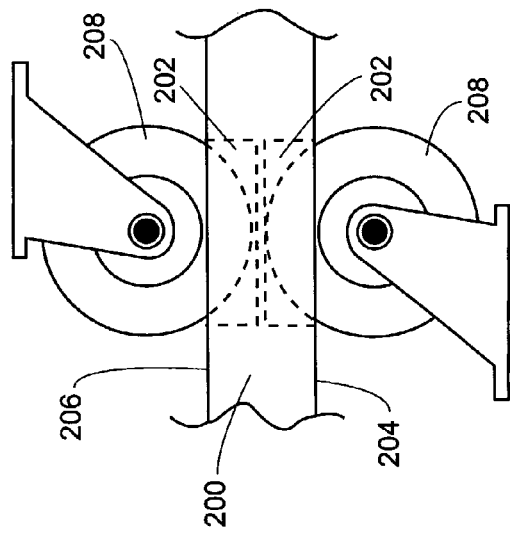
FIG. 2C schematically depicts a cross-sectional view of a portion of a platform component having indentations disposed in both first and second surfaces of the platform component.
Figure 2A:
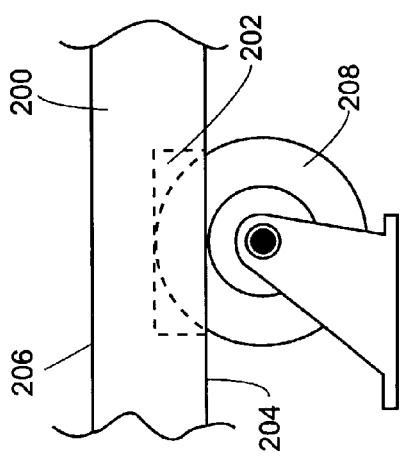
FIG. 2A schematically illustrates a cross-sectional view of a portion of a platform component having an indentation disposed in a first surface of the platform component.

In addition, indentations are optionally disposed in or through platform components of the stackable dollies of the invention. As referred to above, indentations 108 are disposed through platform component 102. FIGS. 2A–C schematically illustrate other embodiments in which indentations are disposed in (i.e., not completely through) the surfaces of platform components. In particular, FIG. 2A schematically illustrates a cross-sectional view of a portion of platform component 200 having indentation 202 (e.g., as part of a first plurality of indentations) disposed in first surface 204 of platform component 200. FIG. 2B schematically shows a cross-sectional view of a portion of platform component 200 having indentation 202 (e.g., as part of a second plurality of indentations) disposed in second surface 206 of platform component 200. In addition, FIG. 2C schematically depicts a cross-sectional view of a portion of platform component 200 having indentations 202 disposed in both first and second surfaces (204 and 206) of platform component 200.

FIGS. 2 A–C also schematically show portions of wheel components 208 (e.g., from other stackable dollies) disposed in indentations 202.

Figure 3A:
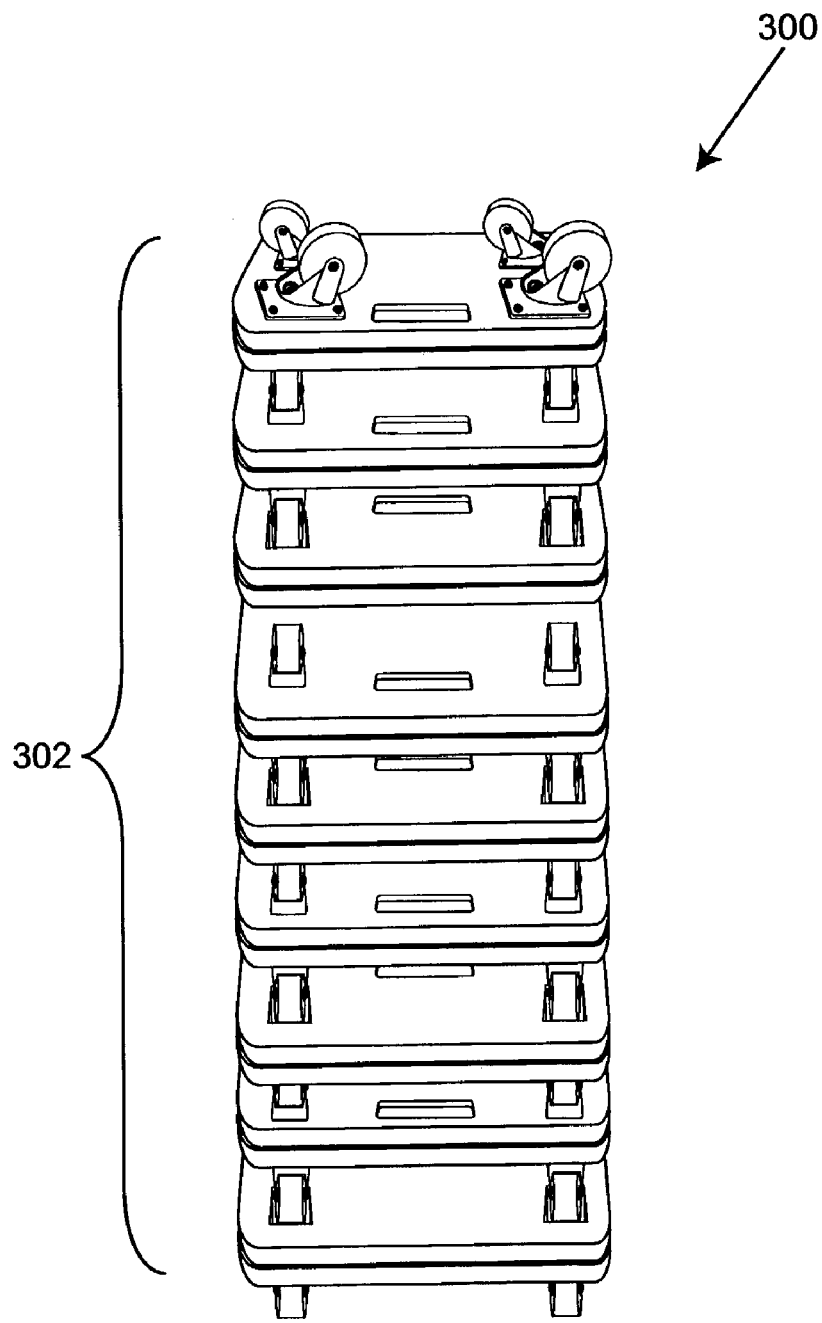
FIG. 3A schematically shows a perspective view of a stackable dolly system according to one embodiment of the invention.
Figure 3B:
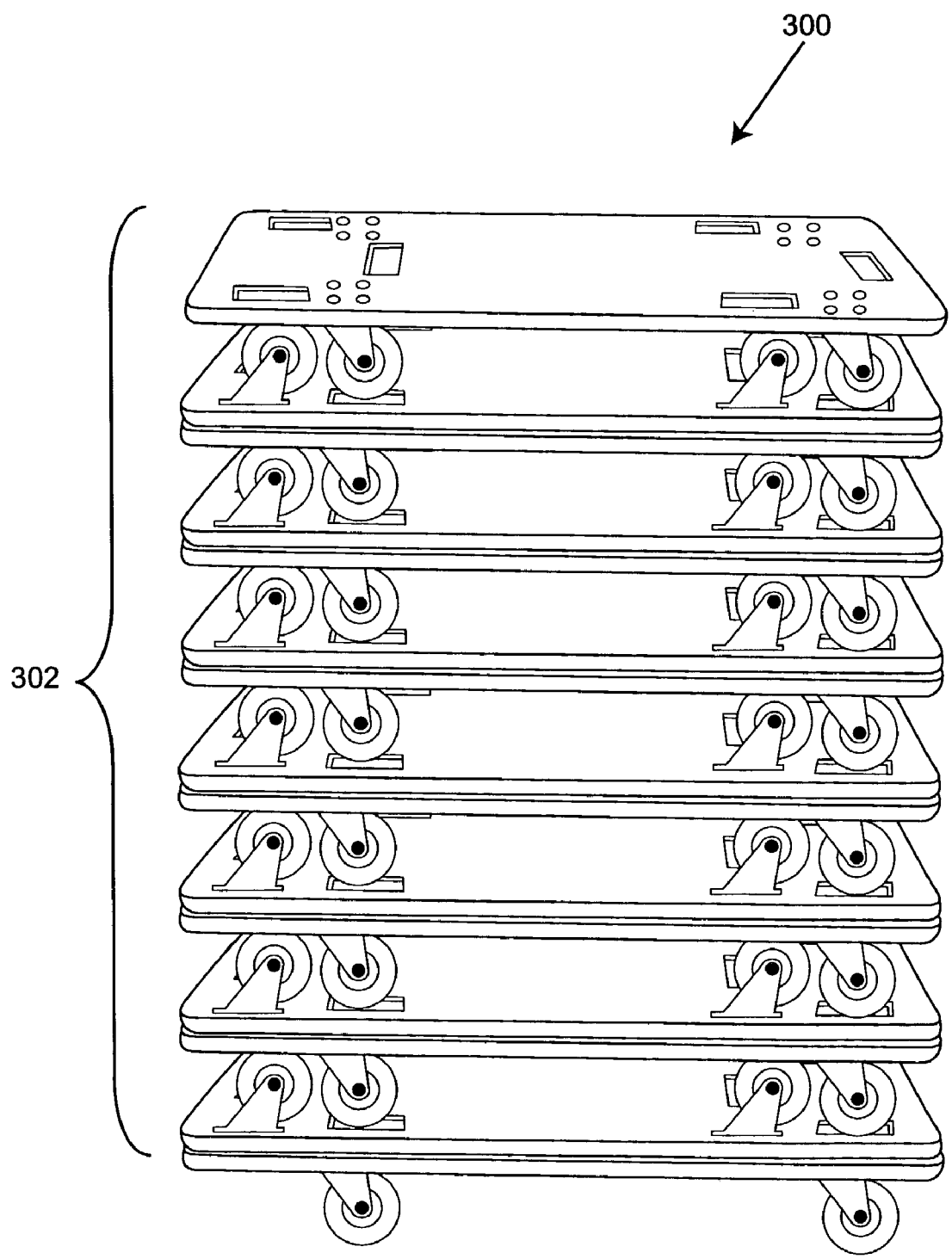
FIG. 3B schematically illustrates the stackable dolly system of FIG. 3A from another perspective view.

FIGS. 3 A and B schematically show perspective views of stackable dolly system 300 according to one embodiment of the invention. As shown, stackable dolly system 300 includes plurality of stackable dollies 302 (described herein) stacked together. The stackable dolly systems of the invention can be stacked more efficiently (e.g., occupy less available space, more securely, faster, etc.) than many pre-existing systems. For example, occupying less available space permits dolly manufacturers to ship higher numbers of stackable dollies in a given space, e.g., a cargo trailer, a train car, or the like. Similarly, efficient stackable dolly systems also permit dolly distributors to store greater numbers of the dollies in a particular space, such as a warehouse or other storage facility.

Figure 4:
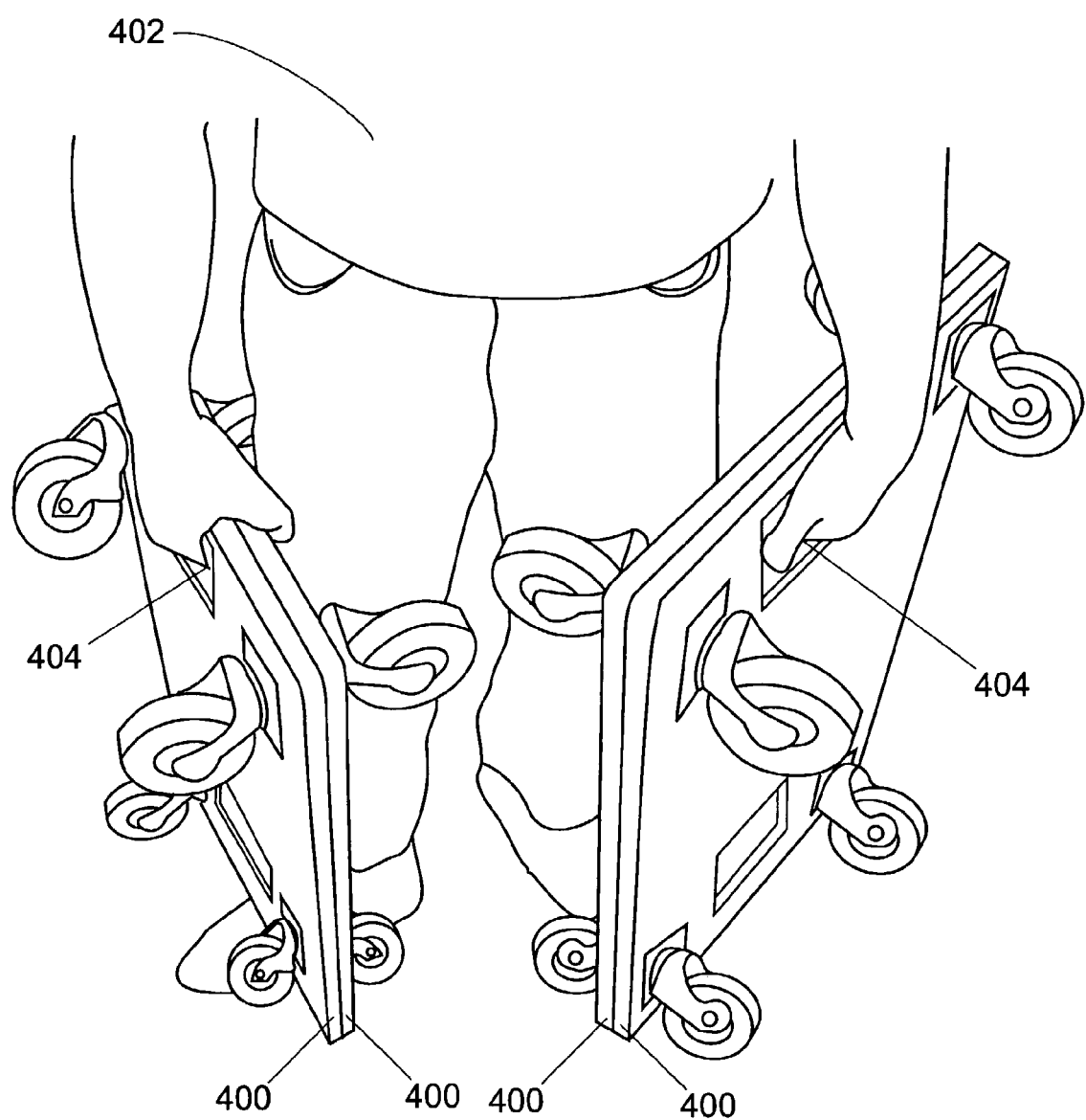
FIG. 4 schematically shows perspective views of multiple stackable dollies being grasped by a user according to one embodiment of the invention.

The stackable dollies of the invention optionally further include openings disposed (e.g., cut, punched, etc.) through platform components such that one or more stackable dollies can be grasped, if desired. To illustrate, FIGS. 1 A and B show representative openings 112 disposed through platform components 106 of stackable dollies 100. To further illustrate, FIG. 4 schematically shows perspective views of multiple stackable dollies 400 being grasped by user 402 through openings 404 according to one embodiment of the invention. The openings disposed through the platform components typically make the stackable dollies of the invention easier to carry than many pre-existing devices.

Figure 5:
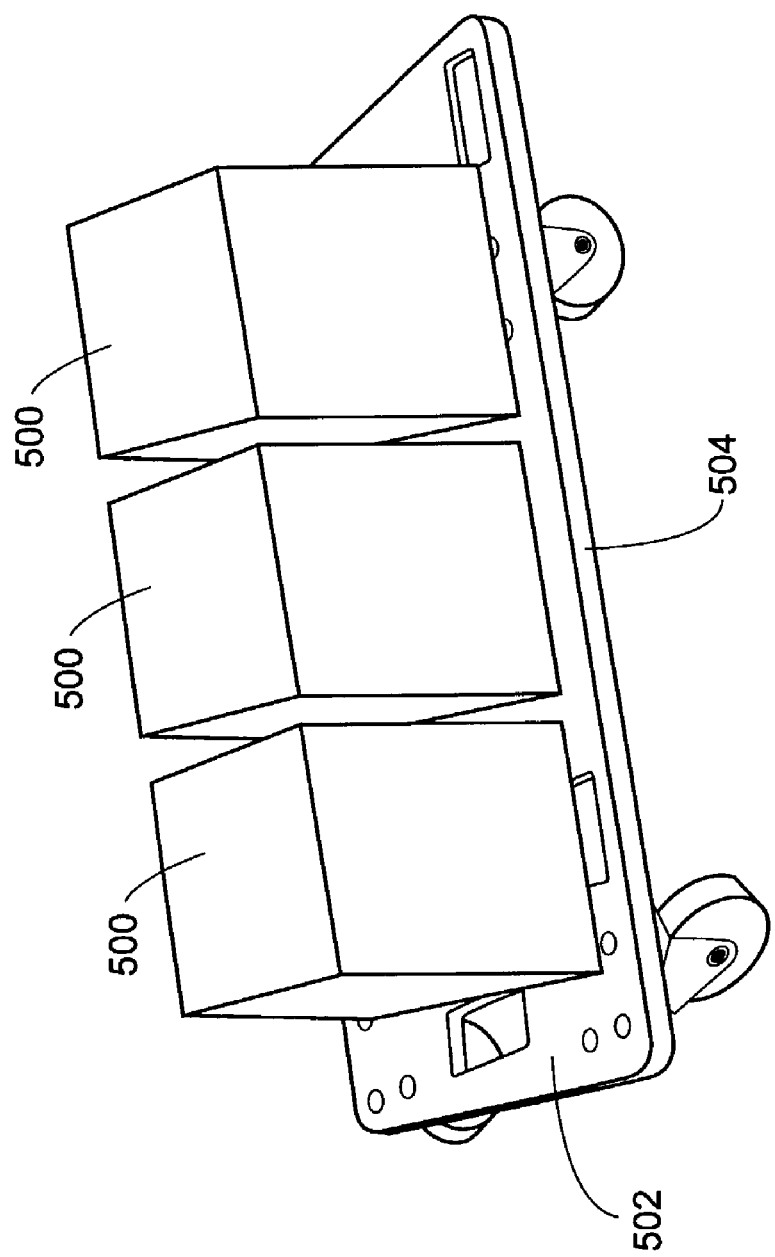
FIG. 5 schematically illustrates multiple objects positioned on a second surface of a stackable dolly from a perspective view according to one embodiment of the invention.
Figure 6:
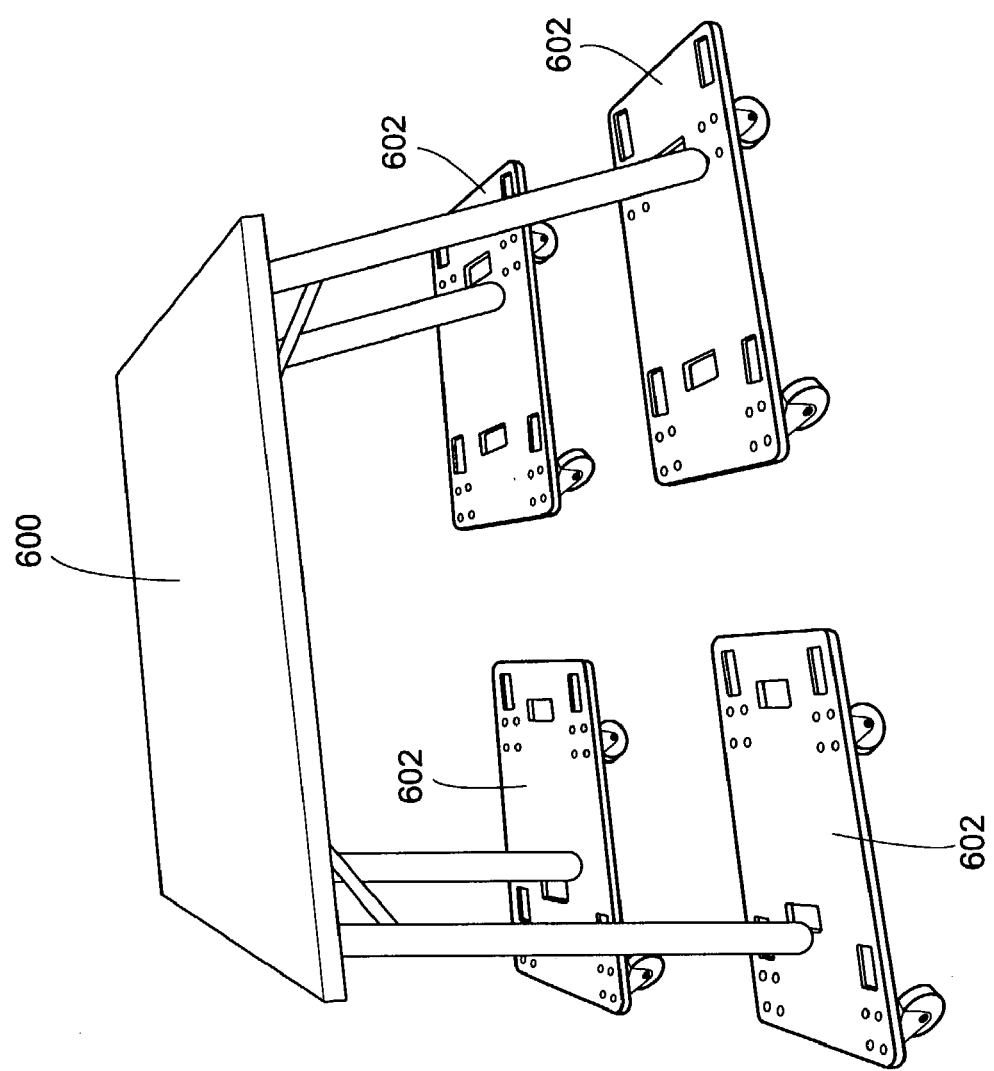
FIG. 6 schematically depicts an object positioned on multiple stackable dollies from a perspective view according to one embodiment of the invention.

FIGS. 5 and 6 schematically depict other aspects of the present invention. In particular, FIG. 5 schematically illustrates multiple objects 500 (shown as boxes) positioned on second surface 502 of stackable dolly 504 from a perspective view according to one embodiment of the invention. Many pre-existing devices lack the substantially solid or continuous top surface of certain embodiments of the stackable dollies of the invention. For example, some pre-existing devices include open frames that do not provide substantially continuous support to an object. See, e.g., U.S. Pat. No. 5,921,566, entitled "DOLLY WITH ONE-PIECE PLASTIC FRAME," which issued Jul. 13, 1999 to Kern et al. Accordingly, these previous devices are typically unable to securely support objects. The substantially continuous and flat top or second surfaces of some embodiments of the dollies of the invention provide a substantially level support, e.g., for symmetrically stacking objects, which typically minimizes the risk of damage to objects during transport of the objects, e.g., by falling off of the dolly or the like. Embodiments of second or top surfaces of the invention are also shown in, e.g., FIG. 1A. In another aspect, FIG. 6 schematically depicts object 600 (shown as a table) positioned on multiple stackable dollies 602 from a perspective view according to one embodiment of the invention. Open frame dollies, such as those referred to above, are typically unable to support objects, e.g., for transport in this manner.

Figure 7A:
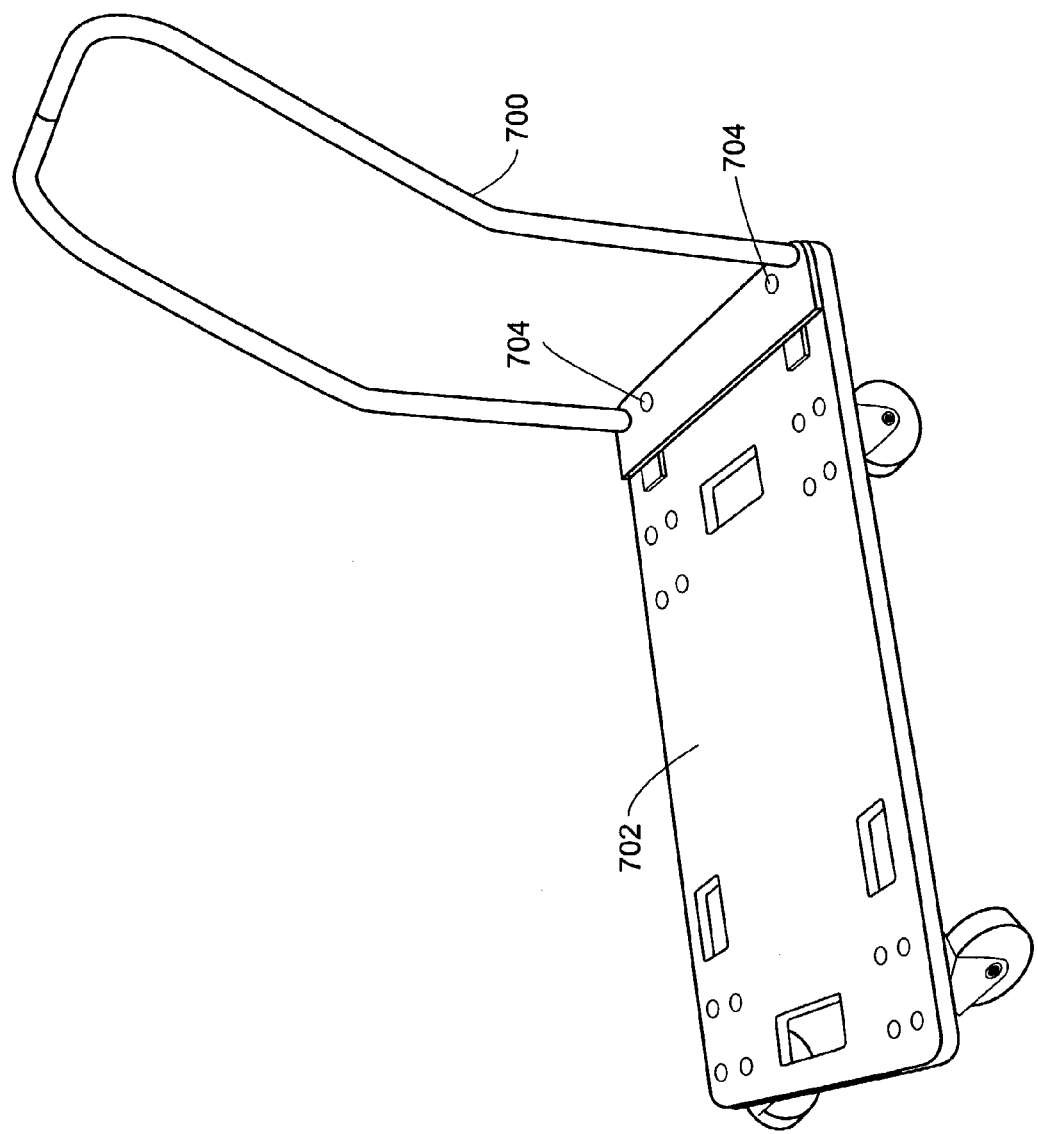
FIG. 7A schematically shows a handle component attached to a stackable dolly from a top perspective view according to one embodiment of the invention.
Figure 7B:
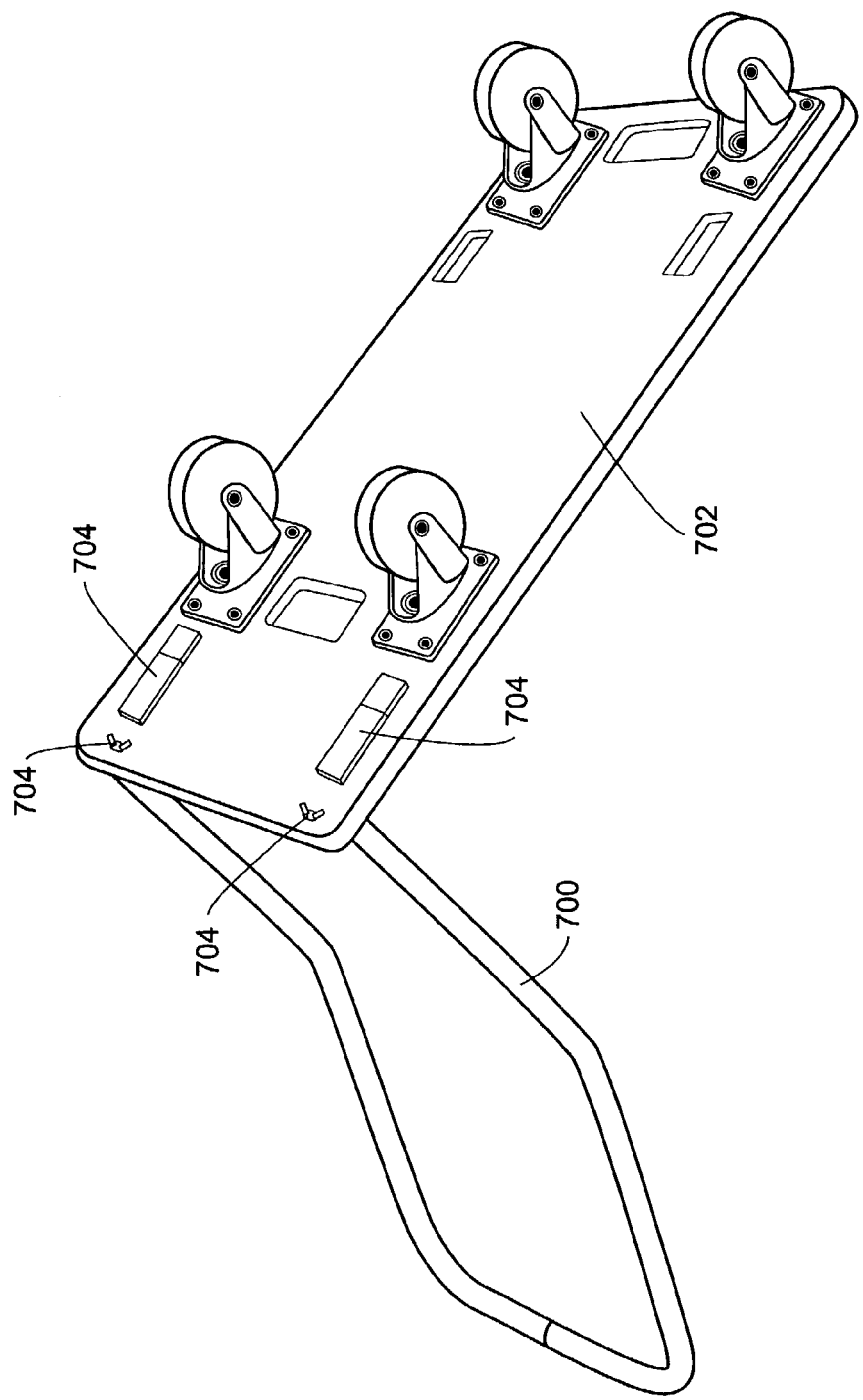
FIG. 7B schematically illustrates the handle component attached to the stackable dolly of FIG. 7A from a bottom perspective view.
Figure 7C:
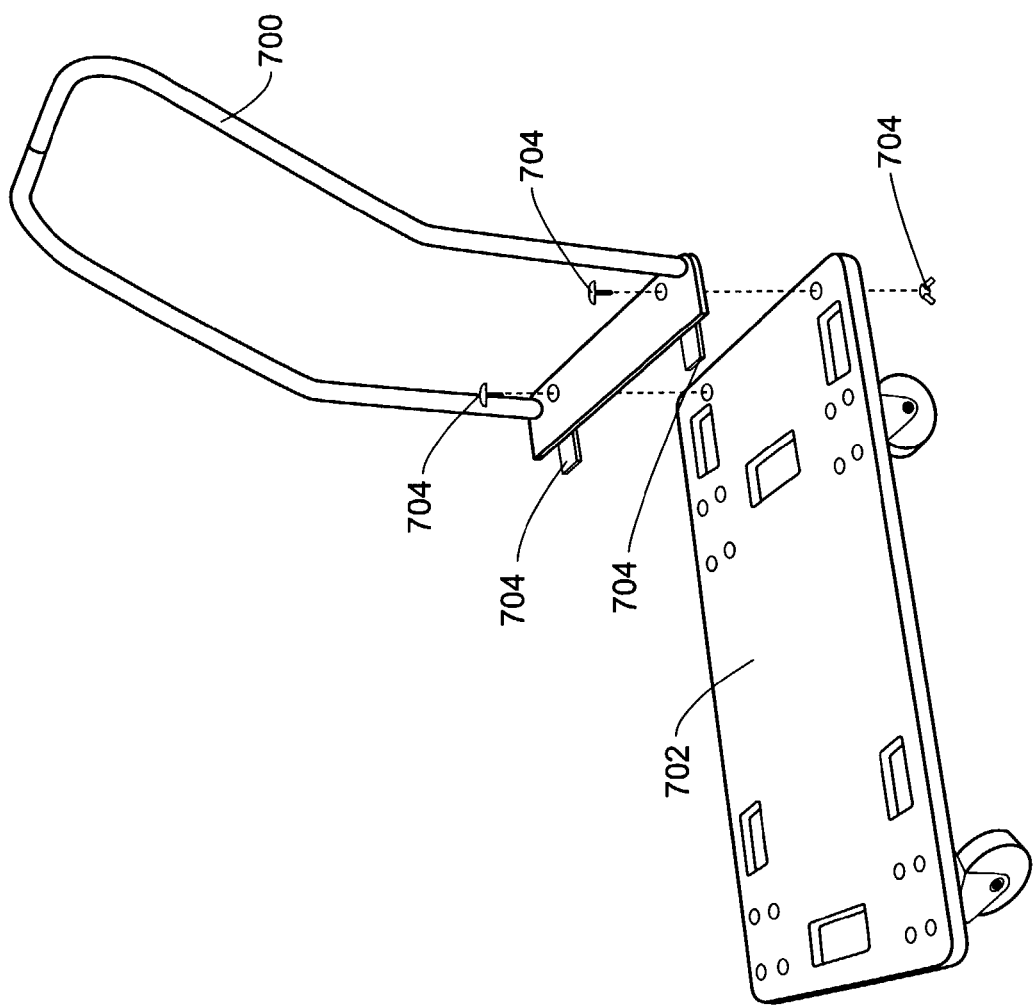
FIG. 7C schematically illustrates a partially exploded top perspective of the handle component and the stackable dolly of FIG. 7A.

In some embodiments of the invention, a stackable dolly further includes at least one handle component removably attached to the platform component by at least one attachment component. One embodiment of a removably attachable handle component is schematically depicted in FIGS. 7A–C. More specifically, FIG. 7A schematically shows handle component 700 attached to stackable dolly 702 from a top perspective view, whereas FIG. 7B schematically illustrates handle component 700 attached to stackable dolly 702 from a bottom perspective view. To further illustrate, FIG. 7C schematically illustrates a partially exploded top perspective view of handle component 700 and stackable dolly 702. As also shown, handle component 700 is attached to stackable dolly 702 by attachment components 704 (shown in this embodiment as bracket elements that insert into indentations on the platform component of stackable dolly 702, and corresponding bolts and wing nuts). Other attachment components that are optionally utilized to removably attach handle components to stackable dollies are known in the art.

Stackable dolly system components (e.g., platform components, handle components, etc.) are optionally formed by various fabrication techniques or combinations of such techniques including, e.g., machining, stamping, engraving, injection molding, cast molding, embossing, extrusion, etching (e.g., electrochemical etching, etc.), or other techniques. These and other suitable fabrication techniques are generally known in the art and described in, e.g., Altintas, *Manufacturing Automation: Metal Cutting Mechanics, Machine Tool Vibrations, and CNC Design*, Cambridge University Press (2000), Molinari et al. (Eds.), *Metal Cutting and High Speed Machining*, Kluwer Academic Publishers (2002), Stephenson et al., *Metal Cutting Theory and Practice*, Marcel Dekker (1997), Rosato, *Injection Molding Handbook*, $3^{rd}$ Ed., Kluwer Academic Publishers (2000), *Fundamentals of Injection Molding*, W. J. T. Associates (2000), Whelan, *Injection Molding of Thermoplastics Materials*, Vol. 2, Chapman & Hall (1991), Fisher, *Extrusion of Plastics*, Halsted Press (1976), and Chung, *Extrusion of Polymers: Theory and Practice*, Hanser-Gardner Publications (2000). In certain embodiments, following fabrication, system components are optionally further processed, e.g., by painting or otherwise coating component surfaces. In some embodiments, a second surface of a platform component further includes a retaining component (e.g., a frictional material, such as a rubber sheet or mat, etc.) fabricated as part of or attached to the second surface that is structured to retain an object when the object is supported and moved on the stackable dolly. To illustrate, FIG. 1A schematically shows retaining element 114 (shown as a rubber sheet) disposed on second surface 106 of stackable dolly 100.

Stackable dolly system component fabrication materials are generally selected according to properties, such as durability, expense, and/or the like. In some embodiments, components (e.g., handle components, wheel components, etc.) are fabricated from various metallic materials, such as stainless steel, anodized aluminum, or the like. In other embodiments, at least certain components are fabricated from wood (e.g., platform components). Optionally, system components (e.g., platform components, handle components, wheel components, etc.) are fabricated from polymeric materials such as, polytetrafluoroethylene (TEFLON™), polypropylene, polystyrene, polysulfone, polyethylene, polymethylpentene, polydimethylsiloxane (PDMS), polycarbonate, polyvinylchloride (PVC), polymethylmethacrylate (PMMA), or the like. Polymeric parts are typically economical to fabricate, which affords disposability.

The invention also provides various methods that include the stackable dollies described herein. For example, the invention provides a method of moving an object. The method includes providing at least one stackable dolly that includes a platform component having first and second surfaces and at least a first plurality of indentations, which first plurality of indentations is disposed at least in the first surface, and which platform component is structured to support at least one object on the second surface. The stackable dolly also includes a plurality of wheel components operably connected to the first surface in which the first plurality of indentations is structured to receive at least portions of wheel components disposed on at least one other stackable dolly. The method also includes placing one or more objects on the second surface of the stackable dolly, and moving the stackable dolly, thereby moving the object.

The invention also provides a method of stacking stackable dollies. The method includes providing a plurality of stackable dollies, each stackable dolly including a platform component having first and second surfaces, and at least a first plurality of indentations disposed at least in the first surface. Each stackable dolly also includes a plurality of wheel components operably connected to the first surface. The method additionally includes placing at least portions of the wheel components of at least a first of the plurality of stackable dollies into the first plurality of indentations of at least a second of the plurality of stackable dollies, thereby stacking the stackable dollies.

While the foregoing invention has been described in some detail for purposes of clarity and understanding, it will be clear to one skilled in the art from a reading of this disclosure that various changes in form and detail can be made without departing from the true scope of the invention. For example, all the techniques and apparatus described above may be used in various combinations. All publications, patents, patent applications, or other documents cited in this application are incorporated by reference in their entirety for all purposes to the same extent as if each individual publication, patent, patent application, or other document were individually indicated to be incorporated by reference for all purposes.

What is claimed is:

1. A stackable dolly, comprising:
    a platform component having first and second surfaces and at least first and second pluralities of aligned indentations, which first plurality of aligned indentations is disposed at least in the first surface, which second plurality of aligned indentations is disposed at least in the second surface, and which platform component is structured to support at least one object on the second surface; and,
    a plurality of wheel components operably connected to the first surface of the platform component, wherein the first and second pluralities of aligned indentations are structured to receive at least portions of wheel components disposed on at least one other stackable dolly.
2. The stackable dolly of claim 1, wherein the first and/or second surface is substantially flat.
3. The stackable dolly of claim 1, wherein the stackable dolly comprises 3, 4, 5, 6, or more wheel components operably connected to the first surface of the platform component.
4. The stackable dolly of claim 1, wherein the stackable dolly comprises 3, 4, 5, 6, or more indentations disposed in the first and second surfaces of the platform component.
5. The stackable dolly of claim 1, wherein the first and second pluralities of aligned indentations are disposed through the platform component.
6. The stackable dolly of claim 1, further comprising at least one opening disposed through the platform component, which opening is structured such that a user can grasp the stackable dolly.
7. The stackable dolly of claim 1, further comprising at least one handle component removably attached to the platform component by at least one attachment component.
8. The stackable dolly of claim 1, wherein the second surface comprises a retaining element that is structured to retain the object when the object is moved on the stackable dolly.
9. The stackable dolly of claim 8, wherein the retaining element comprises a frictional material.
10. A stackable dolly system, comprising a plurality of stackable dollies, each stackable dolly comprising:
    a platform component having first and second surfaces, and at least first and second pluralities of aligned indentations, which first plurality of aligned indentations is disposed at least in the first surface and which second plurality of aligned indentations is disposed at least in the second surface; and
    a plurality of wheel components operably connected to the first surface, wherein the first or second pluralities of aligned indentations of at least a first of the stackable dollies receives at least portions of the wheel components disposed on at least a second of the stackable dollies when the first and second stackable dollies are stacked together.
11. The stackable dolly of claim 10, wherein each of the stackable dollies comprises 3, 4, 5, 6, or more wheel components operably connected to the first surface of the platform component.
12. The stackable dolly of claim 10, wherein each of the stackable dollies comprises 3, 4, 5, 6, or more indentations disposed in the first and second surfaces of the platform component.
13. The stackable dolly of claim 10, wherein the first and second pluralities of aligned indentations are disposed through the platform component.
14. The stackable dolly of claim 10, wherein each of the stackable dollies further comprises at least one opening disposed through the platform component, which opening is structured such that a user can grasp the stackable dolly.
15. A method of moving an object, the method comprising:
    providing at least one stackable dolly comprising:
        a platform component having first and second surfaces and at least first and second pluralities of aligned indentations, which first plurality of aligned indentations is disposed at least in the first surface, which second plurality of aligned indentations is disposed at least in the second surface, and which platform component is structured to support at least one object on the second surface; and
        a plurality of wheel components operably connected to the first surface, wherein the first and second pluralities of aligned indentations are structured to receive at least portions of wheel components disposed on at least one other stackable dolly;
    placing one or more objects on the second surface of the stackable dolly, and,
    moving the stackable dolly, thereby moving the object.

16. A method of stacking stackable dollies, the method comprising:
    providing a plurality of stackable dollies, each stackable dolly comprising:
        a platform component having first and second surfaces, and at least first and second pluralities of aligned indentations, which first plurality of aligned indentations is disposed at least in the first surface and which second plurality of aligned indentations is disposed at least in the second surface; and
        a plurality of wheel components operably connected to the first surface; and,
    placing at least portions of the wheel components of at least a first of the plurality of stackable dollies into the first or second pluralities es of aligned indentations of at least a second of the plurality of stackable dollies, thereby stacking the stackable dollies.

* * * * *